United States Patent
Coleman

(12) 
(10) Patent No.: US 6,173,981 B1
(45) Date of Patent: Jan. 16, 2001

(54) PEDAL-OPERATED VEHICLE

(76) Inventor: Byron C. Coleman, 14024 - 212th Dr. NE., Woodinville, WA (US) 98072

(*) Notice: Under 35 U.S.C. 154(b), the term of this patent shall be extended for 0 days.

(21) Appl. No.: 09/348,762

(22) Filed: Jul. 7, 1999

(51) Int. Cl.[7] .................................................. B62M 1/04
(52) U.S. Cl. .............................. 280/253; 280/221; 74/143
(58) Field of Search ..................................... 280/253, 221, 280/251, 220; 74/126, 143, 137, 141, 142, 141.5

(56) References Cited

U.S. PATENT DOCUMENTS

| | | |
|---|---|---|
| 623,173 | 4/1899 | Noe . |
| 1,237,969 * | 8/1917 | Stocks ................................... 280/251 |
| 1,258,391 * | 3/1918 | Bried ..................................... 280/251 |
| 1,391,165 | 9/1921 | Best . |
| 1,690,342 | 11/1928 | Madsen . |
| 2,002,046 | 5/1935 | Scholtes . |
| 2,086,445 | 7/1937 | Smith . |
| 2,251,005 | 7/1941 | Rubinich .............................. 280/258 |
| 2,286,154 | 6/1942 | Norred ................................... 74/143 |
| 2,653,037 | 9/1953 | Lassiter ................................ 280/258 |
| 2,707,112 | 4/1955 | Ludwigson et al. ................. 280/221 |
| 3,820,820 | 6/1974 | Kutz ..................................... 280/252 |
| 4,108,459 | 8/1978 | Alvigini ............................... 280/215 |
| 4,186,934 * | 2/1980 | Collings .............................. 74/143 X |
| 4,225,147 * | 9/1980 | Lowery .............................. 280/87.01 |
| 4,762,332 * | 8/1988 | Seol ..................................... 74/142 X |
| 4,828,284 | 5/1989 | Sandgren ............................. 280/221 |
| 4,829,841 | 5/1989 | Ogawa .................................. 74/127 |
| 5,192,089 | 3/1993 | Taylor .................................. 280/221 |
| 5,294,140 | 3/1994 | Rinkewich .......................... 280/221 |
| 5,368,321 | 11/1994 | Berman et al. ...................... 280/221 |
| 5,662,346 | 9/1997 | Toronto et al. ...................... 280/252 |

* cited by examiner

Primary Examiner—J. J. Swann
Assistant Examiner—F. Zeender
(74) Attorney, Agent, or Firm—William R. Sharp

(57) ABSTRACT

The invention disclosed herein is a pedal-operated vehicle comprising: a frame; a front wheel and a rear wheel, the front and rear wheels being rotatably mounted to the frame; first and second independently operable pedals reciprocatingly mounted to the frame so as to be capable of upward and downward movement; and a drive mechanism which can be selectively placed in an engaged mode or a disengaged mode, wherein (i) in the engaged mode, downward movement of either pedal imparts torque to the rear wheel in a first rotational direction to propel the vehicle forward and upward movement of either pedal imparts no torque to the rear wheel, the rear wheel being substantially nonrotatable in a second rotational direction opposite to the first rotational direction, and (ii) in the disengaged mode the rear wheel is freely rotatable in the second rotational direction as well as in the first rotational direction.

13 Claims, 4 Drawing Sheets

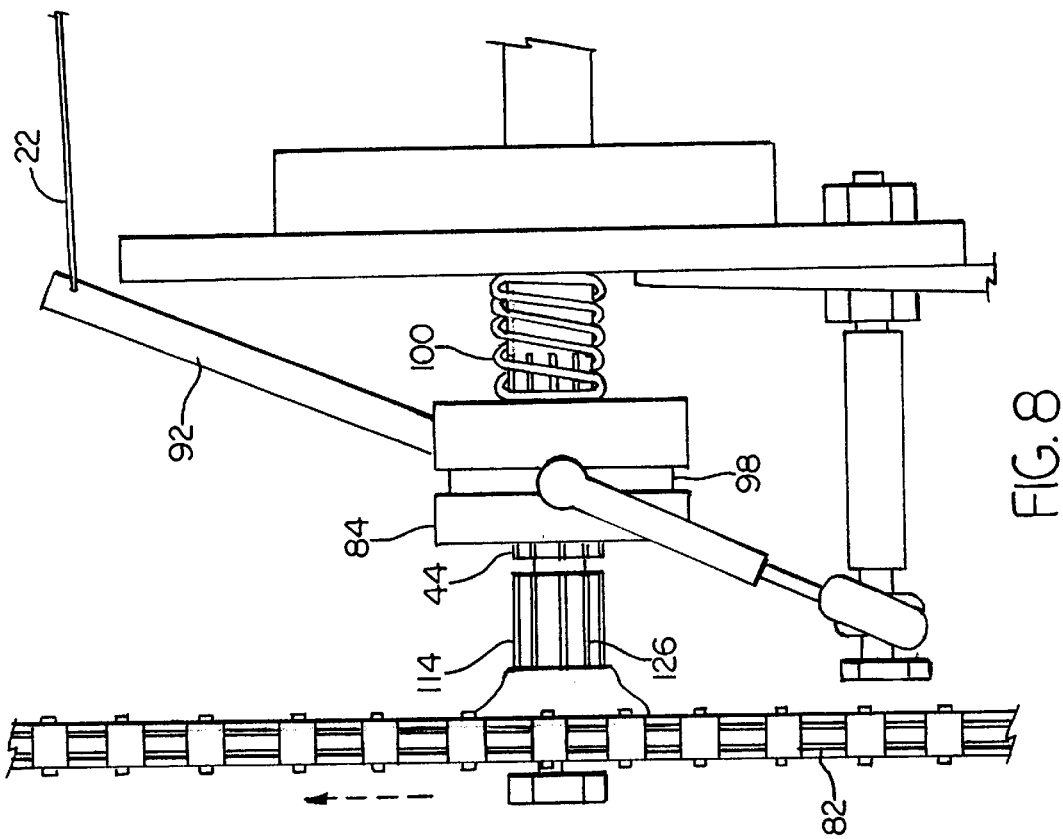
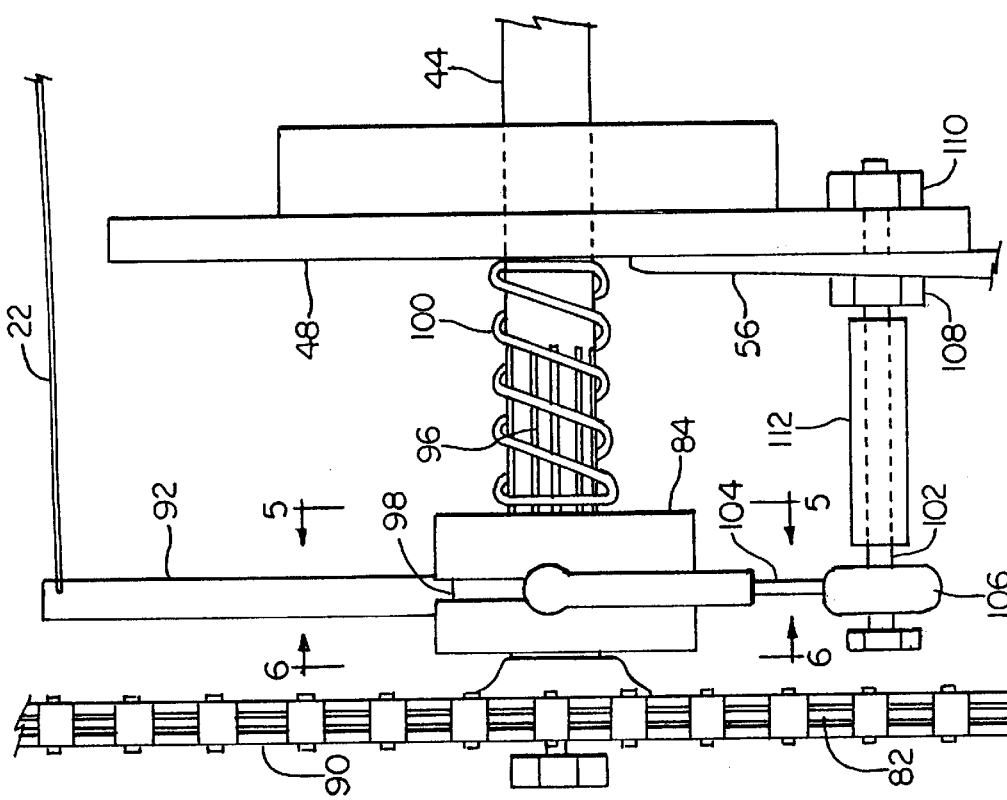

PEDAL-OPERATED VEHICLE

BACKGROUND OF THE INVENTION

The invention relates to a pedal-operated vehicle of the type having reciprocating pedals capable of upward and downward movement.

Various pedal-operated vehicles of the above-mentioned type have been patented over the years. However, such vehicles have all had one or more drawbacks which have adversely affected their utility and marketability. For example, U.S. Pat. No. 5,368,321 of Berman et al. discloses a vehicle having a pair of reciprocating pedals (described as "footboards") and a drive mechanism which cross-couples the pedals together, whereby downward displacement of either pedal causes an equal and upward displacement of the other pedal. Consequently, a person riding the vehicle is highly restricted in the manner of manipulating the pedals. The Berman vehicle also includes a pair of sprockets coupled to a drive shaft by means of "unidirectional" one-way clutches. These clutches substantially prevent backward movement of the vehicle. Such backward movement would be desirable when maneuvering the vehicle into a storage location (particularly if the location is a "tight" space), and also whenever the rider inadvertently travels too far in a forward direction (i.e. into an intersection or past a desired location on a narrow path), and so must back up the vehicle to the desired location.

SUMMARY OF THE INVENTION

It is, therefore, an object of the invention to provide a pedal-operated vehicle having independently operable reciprocating pedals in combination with the capability of backward movement.

The above object is realized by a pedal-operated vehicle comprising: a frame; a front wheel and a rear wheel, the front and rear wheels being rotatably mounted to the frame; first and second independently operable pedals reciprocatingly mounted to the frame so as to be capable of upward and downward movement; and a drive means which can be selectively placed in an engaged mode or a disengaged mode, wherein (i) in the engaged mode, downward movement of either pedal imparts torque to the rear wheel in a first rotational direction to propel the vehicle forward and upward movement of either pedal imparts no torque to the rear wheel, the rear wheel being substantially nonrotatable in a second rotational direction opposite to the first rotational direction, and (ii) in the disengaged mode the rear wheel is freely rotatable in the second rotational direction as well as in the first rotational direction.

According to a preferred embodiment hereafter described in detail with reference to the drawings, coaxial first and second rotatable shafts are selectively engageable with one another by means of a longitudinally movable coupling member. The first shaft is operably and independently connected to the first and second pedals with chains, sprockets, and associated one-way clutches without any cross-coupling of the pedals. Both pedals are biased in an upward direction by suitable means, such as resilient cords. The second shaft is operably connected to the rear wheel with sprockets and an endless chain. Disengagement of the second shaft from the first shaft, which cannot rotate in the second rotational direction because of the one-way clutches, allows free rotation of the second shaft and rear wheel in the second rotational direction, thereby allowing backward movement of the vehicle.

The novel combination of independently operable reciprocating pedals and capability for backward movement makes the vehicle of the invention very user-friendly. Independently operable pedals imposes virtually no restrictions on the manner in which the pedals can be manipulated. A rider can depress the pedals alternately in a stair-stepping motion or operate only one or both pedals at irregular intervals. The rider may also vary the length of stroke with respect to either pedal, or impart no movement to either pedal while coasting in a forward direction. As previously discussed, the capability for backward movement is desirable when the rider inadvertently travels too far in a forward direction, and when maneuvering the vehicle into a storage location.

BRIEF DESCRIPTION OF THE DRAWINGS

FIG. 3 is a side view of a portion of the drive mechanism in an engaged mode for normal operation; that is for riding in a forward direction.

FIG. 8 is a side view of the above-mentioned portion of the drive mechanism in a disengaged mode.

DETAILED DESCRIPTION OF A PREFERRED EMBODIMENT

Figure 1:
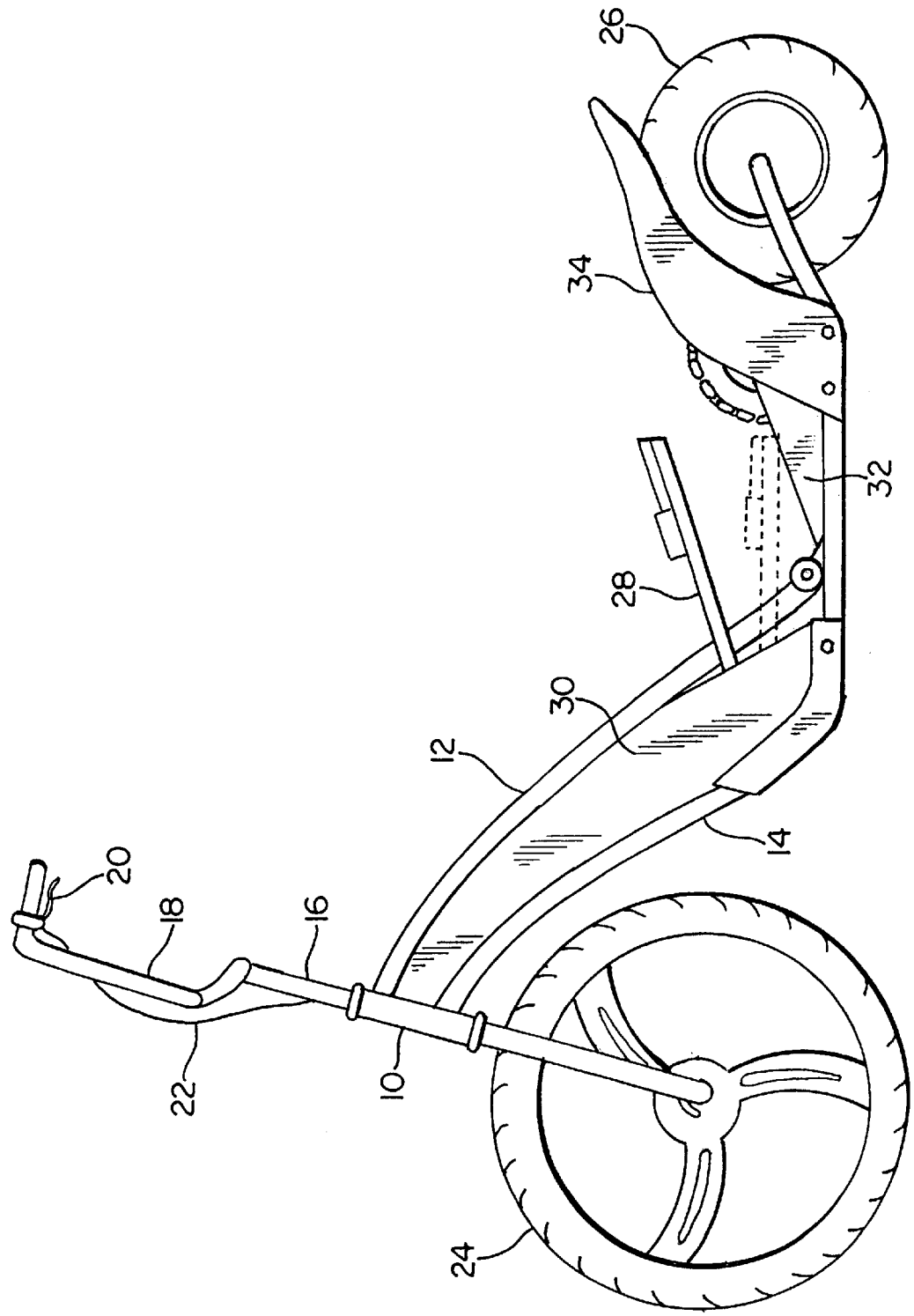
FIG. 1 is a side view of a vehicle in accordance with a preferred embodiment of the invention. The vehicle is shown with shell portions attached to a frame to give the vehicle an attractive appearance.

Referring to FIG. 1, the illustrated vehicle includes a frame which comprises a front frame member 10, a central frame member 12 fixedly connected to front frame member 10 and extending rearwardly therefrom, and a side frame member 14 also fixedly connected to front frame member 10 and extending rearwardly therefrom. Another side frame member on the opposite side of the vehicle is not visible in FIG. 1. A tubular member 16 is rotatably received through front frame member 10 to permit steering of the vehicle. The upper end of tubular member 16 has conventional handlebars connected thereto, of which one such handlebar 18 is visible in FIG. 1. A hand lever 20 is pivotally connected to handlebar 18. A control cable 22 extends from and is operated by hand lever 20 for purposes subsequently described. The lower portion of tubular member 16 bifurcates in a conventional manner to form a "fork", of which one side is shown in FIG. 1 as being connected to the hub of front wheel 24 to permit rotation thereof. The rear portion of side frame member 14, as well as the rear portion of the other side frame member, is connected to the hub of rear wheel 26 to permit its rotation in a manner discussed further below.

The vehicle has a pair of reciprocating pedals, of which one is visible at 28, capable of upward and downward movement. Pedal 28, as shown in solid lines, is in its uppermost position, which it assumes when no downward pressure is applied upon the pedal. Pedal 28, as shown in phantom lines, is in its lowermost position, as it would be upon downward application of pressure by the foot of a rider of the vehicle. The vehicle further has shell portions 30, 32 and 34 fixedly but removably mounted to the frame (i.e. by bolts) to cover up portions of the pedals and drive mechanism, thereby enhancing the attractiveness of the vehicle and also protecting the rider from various moving parts.

An actual vehicle will, of course, typically have such conventional features as a brake and multispeed rear hub with associated control mechanisms for manipulation by the rider. Such features are not shown.

Figure 2:
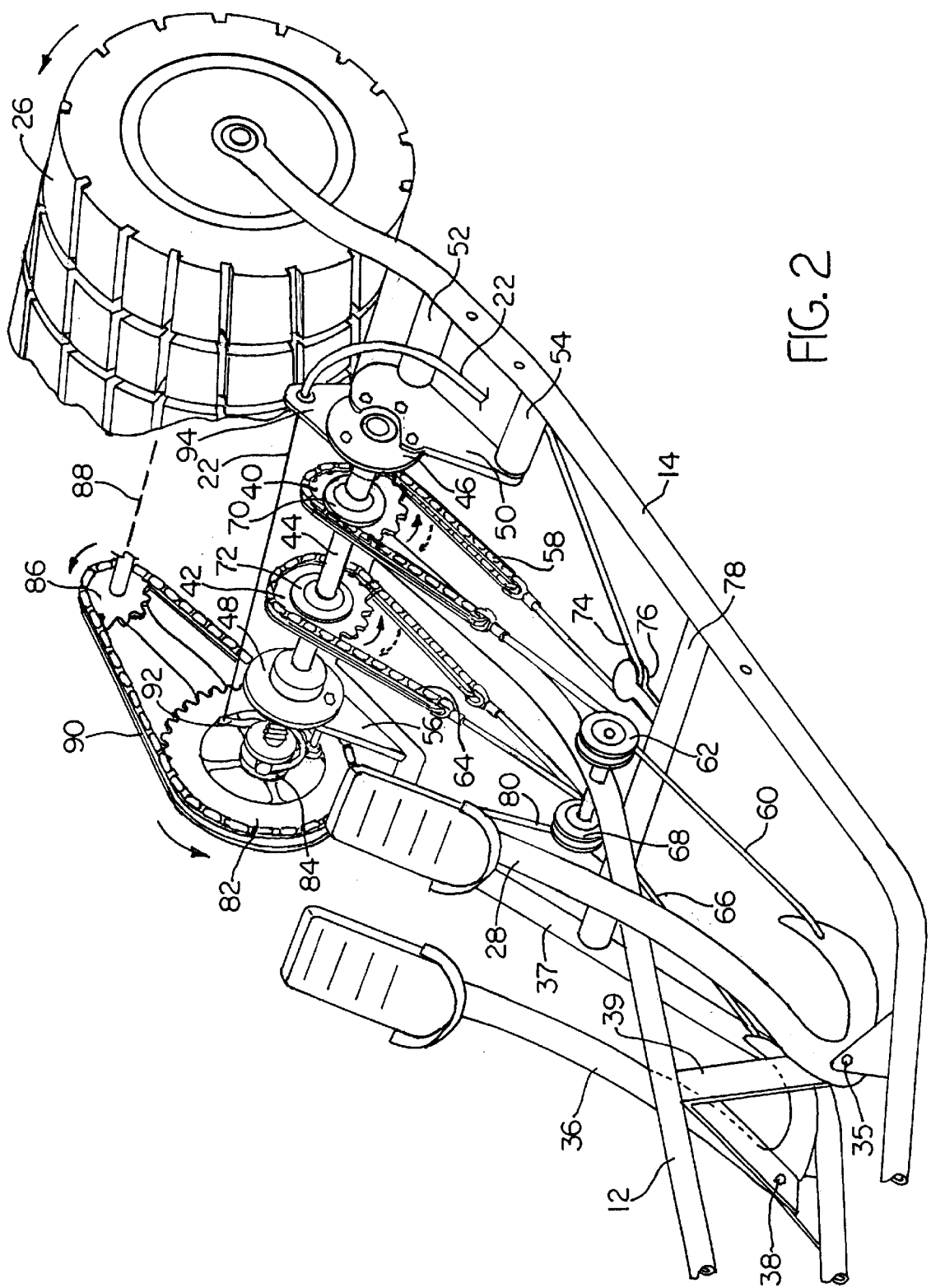
FIG. 2 is a perspective view with shell portions removed in order to show a preferred embodiment of a drive mechanism which operably connects pedals of the vehicle to a rear wheel.

Referring to FIG. 2, pedal 28 is pivotally and reciprocatingly mounted to side frame member 14 at pivot joint 35. Pedal 36 is similarly mounted to side frame member 37 at pivot joint 38. A brace 39 connects pivot joints 35 and 38 to central frame member 12 in order to optimize structural stability. A preferred drive mechanism will now be described which operably connects pedals 28 and 36 to rear wheel 26 so as to allow independent operation of the pedals. Such drive mechanism can also be selectively placed in an engaged mode or a disengaged mode.

Continuing to refer to FIG. 2, sprockets 40 and 42 are mounted on shaft 44, which extends between support bearings 46 and 48. Each of sprockets 40 and 42 can be retained in their desired positions on shaft 44 by any suitable means, such as by annular keys in circumferential keyways on each side of a sprocket (not shown). Support bearing 46 is mounted, preferably by bolts and nuts, to bracket 50. Bracket 50 is fixedly connected, such as by suitable welds, to cross frame members 52 and 54 which are fixedly connected to side frame member 14. Support bearing 48 is similarly mounted to bracket 56, and bracket 56 is fixedly connected to a short, longitudinally extending portion of cross frame member 52. Cross frame member 52 transversely extends from the rear end of such portion to its fixed connection at side frame member 14. The remainder of cross frame member 52 transversely extends from the front end of the above-mentioned longitudinally extending portion to a fixed connection at side frame member 37, which is not visible in FIG. 2.

Chain 58 is received around sprocket 40 and has one end connected to a curved portion of pedal 28 near pivot joint 35 by means of a cable 60. Cable 60 is received under and in contact with rotatable pulley 62, which is mounted on one side of central frame member 12. Central frame member 12 has a rear end fixedly connected to cross frame member 52. Chain 64 is received around sprocket 42 and has one end connected to a curved portion of pedal 36 near pivot joint 38 by means of a cable 66. Cable 66 is received under and in contact with rotatable pulley 68, which is mounted on the opposite side of central frame member 12. Accordingly, downward movement of either pedal rotates the corresponding sprocket in a first rotational direction (indicated by solid arrows), and upward movement of either pedal rotate the corresponding sprocket in a second rotational direction (indicated by broken arrows) opposite to the first rotational direction.

A bushing and clutch assembly 70 is fixedly mounted within a central opening of sprocket 40, and a bushing and clutch assembly 72 is fixedly mounted within a central opening of sprocket 42. Each such assembly includes an outer bushing, fixedly mounted in the sprocket opening, and an inner clutch fixedly mounted inside the outer bushing. Each clutch is preferably a clutch and bearing unit of the type manufactured by Torrington Company. This type of unit has roller bearings in addition to the clutch which contact the exterior surface of shaft 44. The one-way action of each clutch causes rotation of sprocket 40 or sprocket 42 in the first rotational direction to impart torque to shaft 44 in the first rotational direction. Rotation of either of sprockets 40 or 42 in the second rotational direction imparts no torque to shaft 44. Shaft 44 is substantially nonrotatable in the second rotational direction because any torque imparted to the shaft in such rotational direction locks the shaft with respect to the clutches of sprockets 40 and 42, whose corresponding chains 58 and 64 are fixedly and respectively connected to pedals 28 and 36 as previously mentioned. Shaft 44 can freely rotate in the first rotational direction with respect to the clutches of sprockets 40 and 42 whenever, for example, no rotation is imparted to sprocket 40 or sprocket 42.

A suitably resilient cord 74 connects the other end (as opposed to the one end previously mentioned) of chain 58 to side frame member 14. Resilient cord 74 is received around a rotatable pulley 76 which is mounted to cross frame member 78. A resilient cord 80 connects the other end of chain 64 to side frame member 37. Resilient cord 80 is received around a rotatable pulley mounted to cross frame member 78. Neither the connect of cord 80 to side frame member 37 nor the pulley associated with cord 80 are visible in the view of FIG. 2. Resilient cords 74 and 80 bias respective pedals 28 and 36 in an upward direction. Pedals 28 and 36 are shown in their uppermost positions in FIG. 2.

A sprocket 82, larger in diameter than sprockets 40 and 42, is operably connected to shaft 44 in the illustrated engaged mode by mean of coupling member 84 in its engaged position. A sprocket 86, smaller in diameter than sprocket 82, is operably connected to rear wheel 26 by any conventional means, as is schematically indicated at 88. An endless chain 90 is received around sprockets 82 and 86 as shown. Rear wheel 26 (which is assumed to include the tire) preferably has a ratio of diameter to width (as measured parallel to the wheel's rotational axis) less than about 3:1, most preferably about 1:1–3:1, in order to optimize the stability of the vehicle. Because of such dimensions of rear wheel 26, the vehicle is much more stable at slow speeds than with a conventional rear wheel.

In view of the foregoing discussion, it should be apparent that, in the engaged mode, downward movement of either of pedals 28 or 36 imparts torque to rear wheel 26 in the first rotational direction to propel the vehicle forward. This results from the torque in the first rotational direction as imparted to shaft 44, causing such directional rotation of sprocket 82, sprocket 86, and rear wheel 26 (indicated by solid arrows). The rider assumes a standing position on the vehicle and can operate the pedals independently of one another. Upon pressing a pedal downward in a downstroke, this stretches the corresponding resilient cord. When downward pressure upon the pedal is relieved, the pedal returns upwardly because of the upward biasing action of the resilient cord. Upward movement of either pedal imparts no torque to rear wheel 26 because no torque is imparted to shaft 44. If desired, after having propelled the vehicle forward at a desired speed, the rider can simply "coast" forwardly by standing on or both pedals 28 and 36 in their lowermost positions (indicated in phantom lines in FIG. 1). In the engaged mode, rear wheel 26 is substantially nonrotatable in the second rotational direction so as to prevent backward movement of the vehicle. This results from the fact that shaft 44 is substantially nonrotatable in the second rotational direction.

A substantially hook-shaped coupling control lever 92 is operably connected to coupling member 84 in a manner described further below. Control cable 22 is fixedly connected to coupling control lever 92, and extends to and through a flange 94 which is mounted to support bearing 46 and bracket 50 by bolts and nuts. Cable 22, as encased in a suitable plastic sleeve, extends from flange 94 to hand lever 20 (FIG. 1). Only a portion of cable 22 as extending from flange 94 is shown in FIG. 2.

Referring to FIG. 3, shaft 44 has an end portion with multiple longitudinally extending exterior splines 96. Coupling member 84, as shown in its engaged position of the engaged mode, has an exterior and circumferential groove 98. A spring 100 is received around the portion of shaft 44 extending between support bearing 48 and coupling member 84. Spring 100 functions to bias coupling member 84 to its engaged position. Coupling control lever 92 is pivotally connected to a bolt 102 by means of tie rod 104 and socket and ball joint 106 (of which only the socket is visible in FIG. 3). A suitably threaded end portion of bolt 102 extends through an upper portion of bracket 56 and a lower portion of support bearing 48. Bolt 102 is fixedly connected to bracket 56 and support bearing 48 with nuts 108 and 110 as threadedly received on the threaded end portion of bolt 102. A middle portion of bolt 102 is received through a tubular spacer 112 which extends between joint 106 and nut 108. Also shown in FIG. 3 is cable 22 and portions of sprocket 82 and chain 90.

Figure 4:
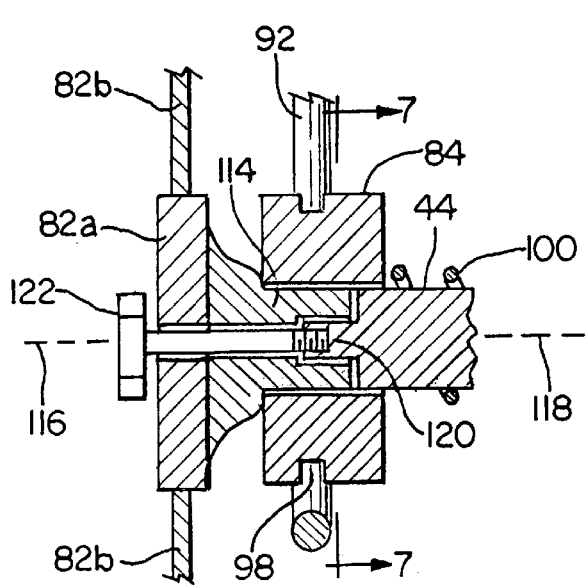
FIG. 4 is a fragmentary, longitudinal cross-sectional view of that portion of the drive mechanism shown in FIG. 3.

Referring to FIG. 4, a shaft 114, considerably shorter than shaft 44, integrally extends from hub 82a of sprocket 82, and has an axis 116 coincident with the axis 118 of shaft 44. A pair of spokes 82b are shown as radially extending from sprocket hub 82a. A journal 120, of smaller diameter than shaft 44, extends from the illustrated end portion of shaft 44. Journal 116 is received in an elongated aperture in shaft 114. A bolt 122 extends through hub 82a and has a threaded end portion which is fixedly and threadedly received within journal 120. The head of bolt 122 is slightly spaced from the outer face of hub 82a. A portion of coupling control lever 92, groove 98 of coupling member 84, and a portion of spring 100 are also shown in FIG. 4. It should be apparent from FIG. 4, when viewed in conjunction with FIG. 2, that shaft 114 is operably connected to rear wheel 26 by means of sprocket 82, sprocket 86, and chain 90.

Figure 5:
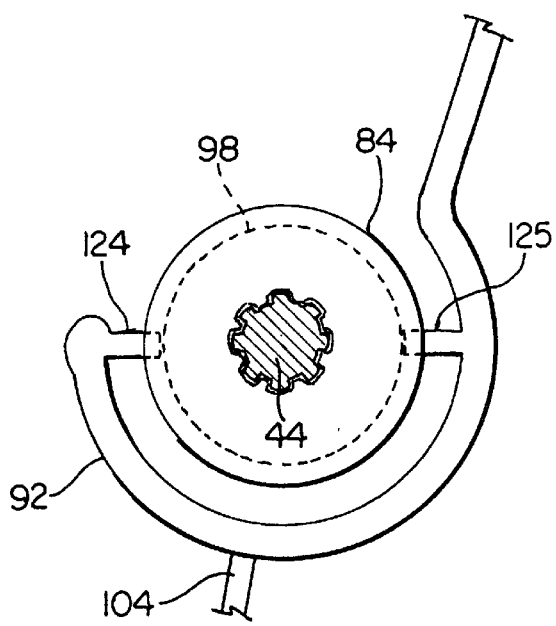
FIG. 5 is a cross-sectional view as viewed along line 5—5 in FIG. 3.
Figure 6:
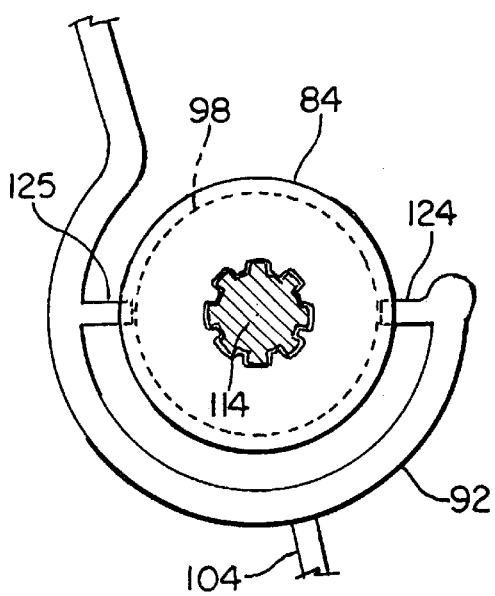
FIG. 6 is a cross-sectional view as viewed along line 6—6 in FIG. 3.

Referring to FIG. 5, this cross-sectional view shows multiple longitudinally extending exterior splines (96 in FIG. 3) of shaft 44 intermeshed with multiple longitudinally extending internal splines of coupling member 84. Circumferential groove 98 is represented by broken lines. Referring to FIG. 6, this cross-sectional view shows the exterior splines of shaft 114 intermeshed with the internal splines of coupling member 84. Accordingly, in viewing FIGS. 5 and 6 in conjunction with FIG. 4, it should be apparent that, in the engaged mode, coupling member 84 couples shaft 44 to shaft 114. Therefore, shaft 114 is engaged with shaft 44 so that, with additional reference to FIG. 2, rotation of shaft 44 in the first rotational direction rotates shaft 114 and rear wheel 26 in the first rotational direction.

Referring again to FIGS. 5 and 6, coupling control lever 92 has opposing bosses 124 and 125 extending therefrom into groove 98 so as to allow rotation of coupling member 84 with shafts 114 and 44 in the first rotational direction when in the engaged mode. Each of FIGS. 5 and 6 also show portions of tie bar 104.

Figure 7:
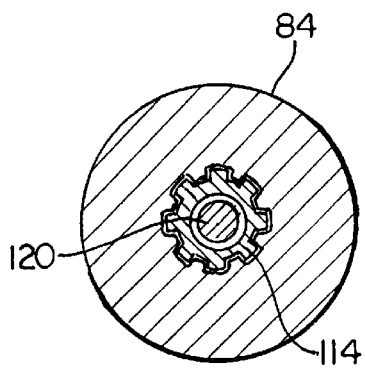
FIG. 7 is a cross-sectional view as viewed along line 7—7 in FIG.

Referring to FIG. 7, this cross-sectional view shows the smooth, cylindrical exterior surface of journal 120, as well as the intermeshing of the exterior splines of shaft 114 and the internal splines of coupling member 84 in the engaged mode.

Referring to FIG. 8, coupling member 84 is shown in its disengaged position after a user of the vehicle has appropriately manipulated (i.e. gripped) hand lever 20 (FIG. 1) so as to pull cable 22, causing coupling control lever 92 to pivot to the right and longitudinally move coupling member 84 in the same direction by means of bosses 124 and 125 extending into groove 98 (FIGS. 5 and 6). Spring 100 is compressed and coupling member 84 is positioned so that its internal splines intermesh with the exterior splines of only shaft 44. The internal splines of coupling member 84 do not intermesh with exterior splines 126 of shaft 114. Therefore, shaft 114 is decoupled and disengaged from shaft 44 so that shaft 114 and sprocket 82 as integrally connected thereto can freely rotate in the second rotational direction as indicated by the broken arrow (as well as in the first rotational direction), thereby allowing rotation of rear wheel 26 (FIG. 2) in the second rotational direction and backward movement of the vehicle if desired. The advantages of the capability for backward movement have been previously discussed. To return to the engaged mode, the user of the vehicle simply releases hand lever 20 (FIG. 1) so that spring 100 biases coupling member 84 back to its engaged position of FIG. 3.

Obviously, many modifications and variations of the present invention are possible in light of the above teachings. For example, as an alternative to sprockets and chains, pulleys and belts could be employed. Or, a pair of rear wheels could be used instead of a single rear wheel. It is, therefore, to be understood that within the scope of the appended claims, the invention may be practiced otherwise than as specifically described.

That which is claimed is:

1. A pedal-operated vehicle comprising:
   a frame;
   a front wheel and a rear wheel, the front and rear wheels being rotatably mounted to the frame;
   first and second independently operable pedals reciprocatingly mounted to the frame so as to be capable of upward and downward movement
   a drive means comprising first and second shafts having coincident axes which are rotatatably mounted to the frame, the first shaft being operably connected to the first and second pedals so that downward movement of either pedal imparts torque to the first shaft in a first rotational direction and upward movement of either pedal imparts no torque to the first shaft, and the second shaft being operably connected to the rear wheel and selectively engageable with the first shaft, wherein the drive means can be selectively placed in engaged and disengaged modes, and wherein (i) in the engaged mode, the second shaft is engaged with the first shaft so that rotation of the first shaft in the first rotational direction rotates the second shaft and rear wheel in the first rotational direction, and downward movement of either pedal thereby imparts torque to the rear wheel in the first rotational direction to propel the vehicle forward and upward movement of either pedal imparts no torque to the rear wheel, the first shaft as well as the second shaft and rear wheel being substantially nonrotatable in a second rotational direction opposite to the first rotational direction, and (ii) in the disengaged mode the second shaft is disengaged from the first shaft so that the second shaft and rear wheel are freely rotatable in the second rotational direction as well as in the first rotational direction; and
   a control means including a cable which can be manipulated by a user of the vehicle to selectively place the drive means in the engaged mode or disengaged mode.

2. A vehicle as recited in claim 1 further comprising a coupling member longitudinally movable by the control means between: an engaged position in the engaged mode, wherein the coupling member couples the first shaft to the second shaft; and a disengaged position in the disengaged mode, wherein the second shaft is decoupled from the first shaft.

3. A vehicle as recited in claim 1 wherein the drive means further comprises: first and second sprockets mounted on the first shaft; first and second chains respectively received around the first and second sprockets and respectively connected to the first and second pedals so that downward movement of either pedal rotates the corresponding sprocket in the first rotational direction and upward movement of either pedal rotates the corresponding sprocket in the second rotational direction; and first and second clutch means respectively associated with the first and second sprockets so that rotation of either sprocket in the first rotational direction imparts torque to the first shaft in the first rotational direction and rotation of either sprocket in the second rotational direction imparts no torque to the first shaft, wherein the first shaft is substantially nonrotatable in the second rotational direction because any torque imparted to the first shaft in such rotational direction locks the first shaft with respect to the first and second sprockets, whose corresponding first and second chains are fixedly and respectively connected to the first and second pedals as aforementioned.

4. A vehicle as recited in claim 3 further comprising first and second pedal biasing means for biasing the respective first and second pedals in an upward direction.

5. A vehicle as recited in claim 4 wherein the first chain has opposing ends of which one end is connected to the first pedal, and the second chain has opposing ends of which one end is connected to the second pedal, and wherein the first pedal biasing means comprises a first resilient cord connecting the other end of the first chain to the frame, and the second pedal biasing means comprises a second resilient cord connecting the other end of the second chain to the frame.

6. A vehicle as recited in claim 5 further comprising: a third sprocket mounted on the second shaft: a fourth sprocket connected to the rear wheel; and a third, endless chain received around the third and fourth sprockets.

7. A vehicle as recited in claim 6 which has a single rear wheel with a ratio of diameter to width of less than about 3:1.

8. A pedal-operated vehicle comprising:
a frame;
a front wheel and a rear wheel, the front and rear wheels being rotatably mounted to the frame;
first and second independently operable pedals reciprocatingly mounted to the frame so as to be capable of upward and downward movement;
a drive means which includes first and second shafts rotatably mounted to the frame and having coincident axes and adjacent end portions with multiple longitudinally extending exterior splines, wherein the first shaft is operably connected to the first and second pedals so that downward movement of either pedal imparts torque to the first shaft in a first rotational direction and upward movement of either pedal imparts no torque to the first shaft, and wherein the second shaft is operably connected to the rear wheel; and
a coupling member having multiple longitudinally extending internal splines and being longitudinally movable between (i) an engaged position of an engaged mode in which the internal splines of the coupling member intermesh with the exterior splines of the first and second shafts to thereby couple the first shaft to the second shaft so that rotation of the first shaft in the first rotational direction rotates the second shaft and rear wheel in the first rotational direction to propel the vehicle forward, the first shaft as well as the second shaft and rear wheel being substantially nonrotatable in a second rotational direction opposite to the first rotational direction, and (ii) a disengaged position of a disengaged mode in which the internal splines of the coupling member intermesh with only the exterior splines of the first shaft so that the second shaft is decoupled from the first shaft, the second shaft and rear wheel thereby being freely rotatable in the second rotational direction as well as in the first rotational direction.

9. A vehicle as recited in claim 8 further comprising a control means which allows a user of the vehicle to selectively move the coupling member between its engaged and disengaged positions.

10. A vehicle as recited in claim 9 wherein the control means comprises: a coupling control lever operably connected to the coupling member to allow rotation of the coupling member with the first and second shafts in the first rotational direction when in the engaged mode; and a cable fixedly connected to the coupling control lever so that the cable can be manipulated by the user to selectively move the coupling member between its engaged and disengaged positions of the respective engaged and disengaged modes.

11. A vehicle as recited in claim 10 wherein the coupling member has an exterior and circumferential groove, wherein the coupling control lever is capable of pivotal movement between positions corresponding to engaged and disengaged positions of the coupling member, and further wherein the coupling control lever has a pair of opposing bosses extending therefrom into the groove.

12. A vehicle as recited in claim 7 further comprising a coupling member biasing means for biasing the coupling member to its engaged position.

13. A pedal-operated vehicle comprising:
a frame;
a front wheel and a rear wheel, the front and rear wheels being rotatably mounted to the frame;
first and second independently operable pedals reciprocatingly mounted to the frame so as to be capable of upward and downward movement and
a drive means which can be selectively placed in engaged and disengaged modes independent of the positioning of the pedals, wherein (i) in the engaged mode, downward movement of either pedal imparts torque to the rear wheel in a first rotational direction to propel the vehicle forward and upward movement of either pedal imparts no torque to the rear wheel, the rear wheel being substantially nonrotatable in a second rotational direction opposite to the first rotational direction, and (ii) in the disengaged mode the rear wheel is freely rotatable in the second rotational direction as well as in the first rotational direction.

* * * * *